United States Patent
Delle Piane et al.

(10) Patent No.: US 6,642,474 B2
(45) Date of Patent: Nov. 4, 2003

(54) PROCESS FOR THE PRODUCTION OF MULTI-THICKNESS AND/OR MULTI-MATERIAL BLANKS

(75) Inventors: Alberto Delle Piane, Bruino (IT); Duilio Macchi, Turin (IT)

(73) Assignee: Prima Industries, SpA (IT)

( * ) Notice: Subject to any disclaimer, the term of this patent is extended or adjusted under 35 U.S.C. 154(b) by 0 days.

(21) Appl. No.: 09/894,936

(22) Filed: Jun. 28, 2001

(65) Prior Publication Data

US 2002/0000429 A1 Jan. 3, 2002

(30) Foreign Application Priority Data

Jun. 30, 2000 (IT) ...................................... TO2000A0648

(51) Int. Cl.$^7$ ............................................... B23K 26/20
(52) U.S. Cl. ................................................. 219/121.64
(58) Field of Search ....................... 219/121.63, 121.64, 219/121.67, 121.72, 121.82, 121.85; 228/5.7

(56) References Cited

U.S. PATENT DOCUMENTS

| | | | | |
|---|---|---|---|---|
| 3,421,676 A | * | 1/1969 | Jenkins | |
| 5,037,024 A | * | 8/1991 | Minato et al. | |
| 5,045,668 A | * | 9/1991 | Neiheisel et al. | |
| 5,056,703 A | * | 10/1991 | Sawada et al. | |
| 5,182,428 A | * | 1/1993 | Jack et al. | |
| 5,234,154 A | * | 8/1993 | Kajiwara et al. | |
| 5,266,770 A | * | 11/1993 | Noe | |
| 5,498,849 A | * | 3/1996 | Isshiki et al. | |
| 6,053,392 A | * | 4/2000 | Aebersold et al. | |

\* cited by examiner

*Primary Examiner*—Samuel M. Heinrich
(74) *Attorney, Agent, or Firm*—TraskBritt

(57) ABSTRACT

A process for the production of multi-thickness and/or multi-material blanks, comprising the steps of: setting and withholding a first piece (P1) of metal sheet on a first workpiece-supporting structure (38); setting and withholding a second piece (P2) of metal sheet on a second workpiece-supporting structure (40) which is mobile with respect to the first workpiece-supporting structure (38) under the control of a numerical-control unit (14); carrying out laser cutting of at least one edge of the first piece (P1) and of the second piece (P2) and defining reference lines (58, 60) of the first piece and second piece, respectively, the positions of which are known to the numerical-control unit (14); bringing the first piece (P1) and the second piece (P2) up to one another until they reach a position where the aforesaid reference lines (58, 60) overlap one another; and carrying out a laser weld between the first piece (P1) and the second piece (P2) along the aforesaid coinciding reference lines (58, 60).

4 Claims, 4 Drawing Sheets

PROCESS FOR THE PRODUCTION OF MULTI-THICKNESS AND/OR MULTI-MATERIAL BLANKS

The present invention relates to a process for the production of multi-thickness and/or multi-material blanks of metal sheet, known as "Tailored Welded Blanks" (TWBs).

TWBs are used in numerous technical sectors whenever it is necessary to produce metal pieces having differentiated strengths. A typical field of use is the sector of construction of vehicle bodies. A TWB generally consists of two or more pieces of metal sheet having different thicknesses or being made of different materials that are welded together. In the simplest case, the line of jointing between the blanks is rectilinear, but in many cases it is necessary to make TWBs with non-linear jointing lines, or else with jointing lines including a number of rectilinear stretches having different angles.

Traditional plants for the production of TWBs on an industrial scale envisage the use, as starting material, of pieces of metal sheet cut using shearing machines. However, in current practice, unless high-precision shearing machines are used, and hence ones having a very high cost, the edges of said pieces of metal sheet have a rough surface finish, or in any case a surface finish such as not to enable convenient butt welding of the edges themselves. The rough pieces of metal sheet then undergo a preliminary blanking operation, by means of which pieces are obtained that have precise dimensions and a good degree of surface finish along the welding edges. At the end of the blanking operation, the pieces are positioned in a welding system where butt welding of two or more pieces having different thicknesses is performed along a welding path coinciding with the line of jointing between the pieces. The welding operation can be performed using laser-welding machines.

The conventional technology for the production of multi-thickness and/or multi-material blanks described above presents various drawbacks. A first drawback is represented by the fact that, at the end of the blanking operation, an operation is required for relative positioning of the pieces to be welded and for referencing of the pieces to the co-ordinate system of the welding plant. Usually, the said referencing operation is carried out using mechanical locator blocks, but this system may give rise to numerous problems and difficulties in the case of pieces with complex shapes that are to be welded together along non-rectilinear paths. A second drawback is represented by the need to use high-precision shearing machines that are very costly in terms of investment and maintenance, or else to perform a preliminary blanking of the pieces to be welded. The said blanking operation produces a considerable amount of waste material and requires costly and rigid equipment which needs to undergo routine maintenance and must be replaced in the case where the shape and/or size of the pieces to be blanked varies.

The purpose of the present invention is to provide a process for the production of multi-thickness and/or multi-material blanks that enables the aforesaid drawbacks to be overcome.

According to the present invention, the above purpose is achieved by a process having the characteristics that form the subject of claim 1.

The present invention will now be described in detail with reference to the attached drawings, which are provided purely by way of non-limiting example, and in which.

Figure 1:
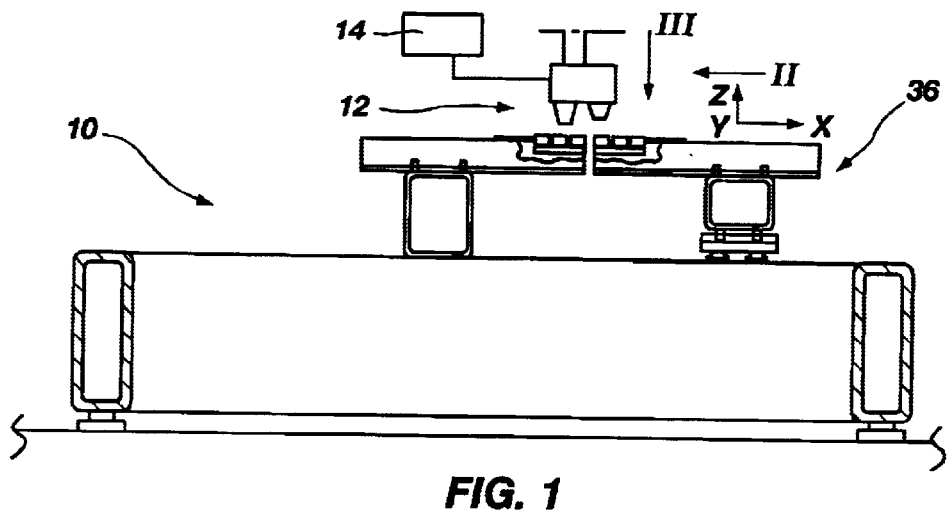
FIG. 1 is a schematic side view of a laser cutting and welding system arranged for carrying out a process according to the present invention.
Figure 2:
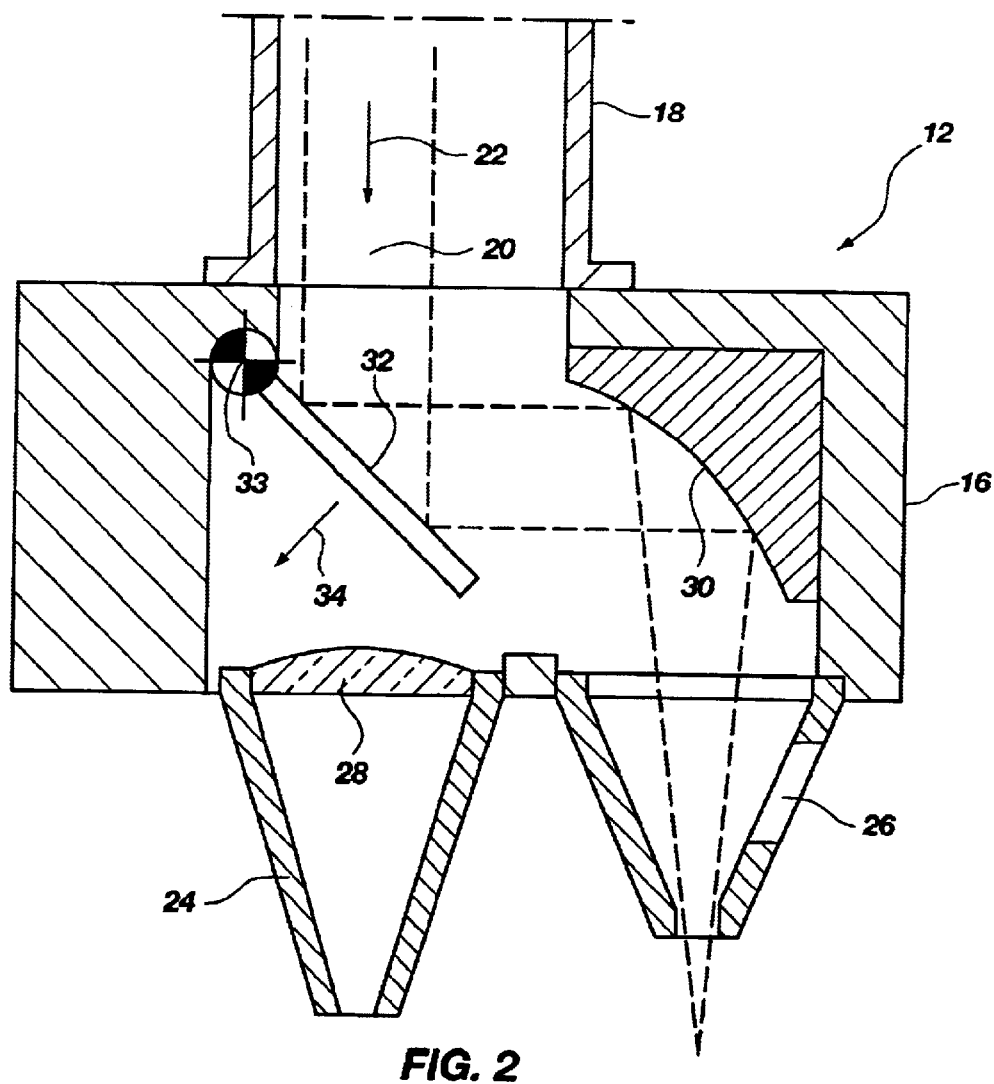
FIG. 2 is a schematic view, at a larger scale, of the detail indicated by the arrow II in FIG. 1.
Figure 3:
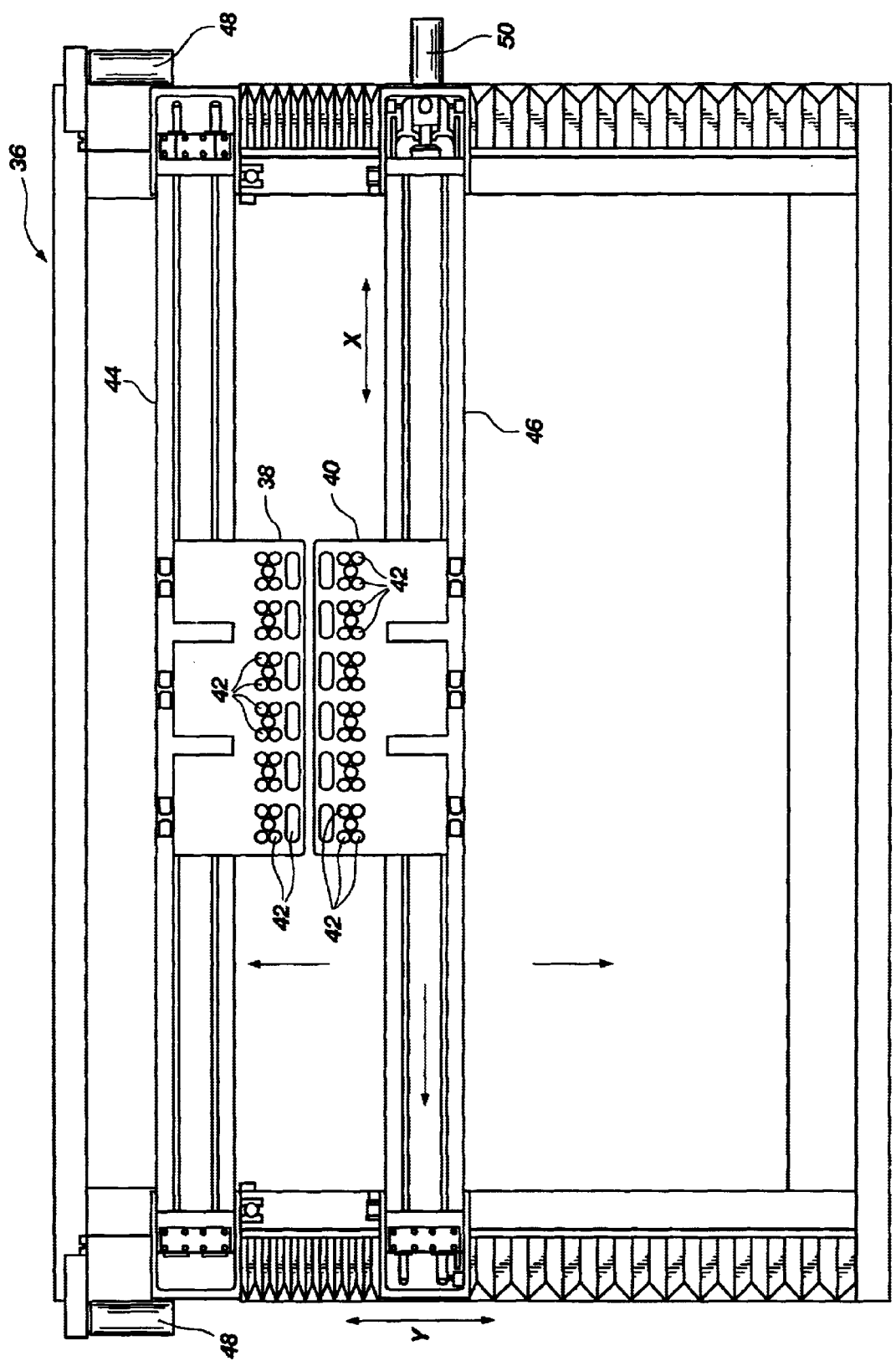
FIG. 3 is a plan view according to the arrow III in FIG. 1.

With reference to FIGS. 1 to 3, the number 10 designates a plant for the production of multi-thickness and/or multi-material blanks, comprising a laser cutting and welding head 12 which is mobile in an X-Y-Z co-ordinate system and is controlled by a numerical-control unit, designated by 14. In the example illustrated in FIG. 2, the head 12 is set for carrying out laser cutting and welding operations. As schematically illustrated in FIG. 2, the head 12 comprises a body 16 carried at one end of a mobile member 18 forming part of a Cartesian movement system. In a conventional way, a laser beam 20 is guided by an optical chain and reaches the head 12 in the direction indicated by the arrow 22 in FIG. 2. The body 16 of the head 12 carries a cutting tip 24 and a welding tip 26. The cutting tip 24 is associated to a focusing lens 28, whilst the welding tip 26 is associated to a parabolic mirror 30. The head 12 carries a mirror 32 articulated to the body 16 about an axis 33 which is orthogonal to the plane of representation of the drawing and is mobile between one, operative, position, illustrated in FIG. 2, and one, inoperative, position, in which it is rotated through approximately 45° in the direction indicated by the arrow 34 with respect to the operating position. When the mirror 32 is in the inoperative position, the laser beam 20 moving in the direction 18 is directed onto the focusing lens 28, and the cutting tip 24 is operative. When the mirror 32 is in the operative position illustrated in FIG. 2, the laser beam 20 moving in the direction 22 is deflected through 90° by the mirror 32 and is sent onto the parabolic mirror 30, which deflects and focuses the laser beam through the welding tip 26.

With reference to FIGS. 1 and 3, the laser cutting and welding machine 10 comprises a table 36 including at least one mobile supporting structure which is moved under the control of the numerical control unit 14. In the example illustrated in the figures, the table 36 comprises a stationary workpiece-supporting structure 38 and a mobile workpiece-supporting structure 40, which moves along two mutually orthogonal directions, designated by X and Y in FIG. 3. The workpiece-supporting structures 38, 40 are provided with respective retention means 42 consisting, for example, of suction pads that can be connected to a vacuum source (not illustrated). In the embodiment illustrated by way of example in the figures, the stationary workpiece-supporting structure 38 is carried by a stationary beam 44, whilst the mobile structure 40 is carried by a beam 46 which is moved in the Y direction by a pair of motors 48 (FIG. 3) and is likewise mobile in the X direction under the control of a motor 50. The motors 48, 50 are governed by a numerical-control unit, preferably consisting of the same unit that governs movement of the laser cutting and welding head 12.

For making pieces having a more complex shape, the table 36 can be equipped with a second stationary beam (not illustrated) parallel to the beams 44, 46, the said second beam carrying a workpiece-supporting structure similar to the structures 38, 40 and set on the opposite side of the mobile beam 46 with respect to the stationary beam 44.

With reference to FIGS. 4 to 8, the operating sequence for the production of a multi-thickness and/or multi-material blank by means of the laser cutting and welding system previously illustrated will now be described.

Figure 4:
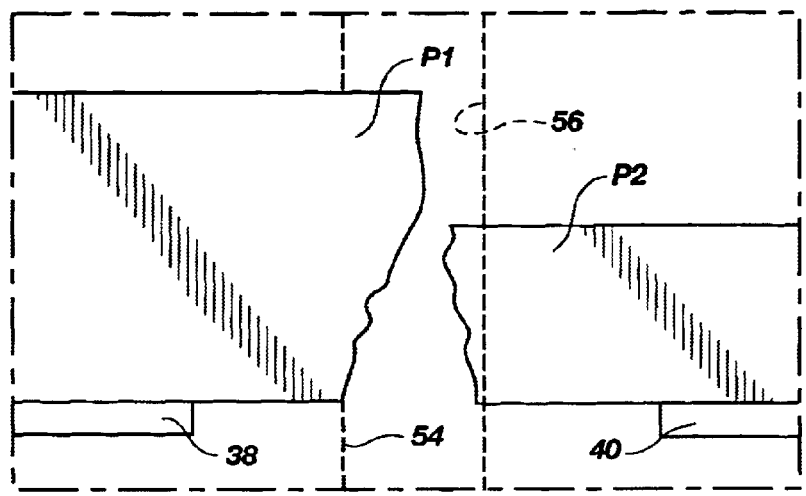
FIGS. 4 to 8 are schematic cross-sectional views illustrating the operating sequence of the process according to the present invention.

With reference to FIG. 4, two pieces of metal sheet having different thicknesses and/or being made of different materials are positioned and withheld on the respective workpiece-supporting structures 38, 40. The pieces P1 and P2 are rough pieces of metal sheet that have not been pre-blanked and have been obtained by shearing, and have perimetral edges that may be even markedly irregular. The pieces P1 and P2 are positioned on the respective workpiece-supporting structures 38, 40 without any particular precision. When the pieces P1 and P2 are positioned on the tables 38, 40, there does not yet exist a precise correlation between the position of the pieces and the co-ordinate system of the cutting and welding machine. Designated by 54 in FIG. 4 is the trace of a reference surface along which joining of the pieces P1 and P2 is to be carried out. The co-ordinates of the reference surface 54 are stored beforehand in the numerical-control unit of the system. The piece P1 is positioned on the workpiece-supporting structure 38 with approximate precision but in such a way that one edge of the piece P1 extends beyond the reference surface 54.

Figure 5:
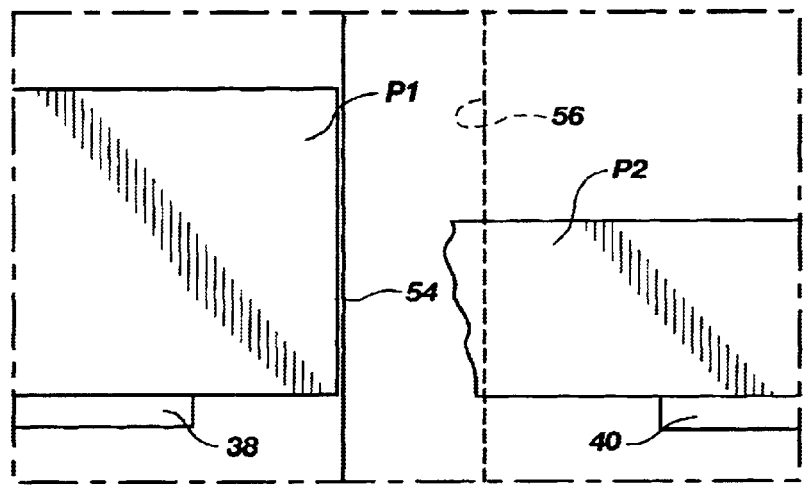
Figure 6:
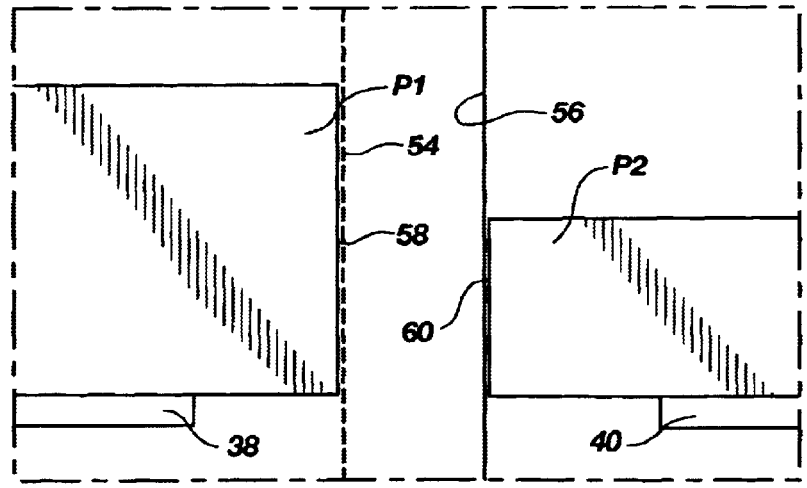

As illustrated in FIG. 5, the first operation envisages cutting of the piece P1 along a cutting plane 54 which coincides with the reference surface 54. Next, as illustrated in FIG. 6, laser cutting of the edge of the piece P2 along a reference surface 56, the co-ordinates of which have been pre-stored in the numerical-control unit of the system, is carried out. Following upon the laser-cutting operations, the pieces P1 and P2 present edges 58, 60 facing one another which have a degree of surface finish comparable with the one that is obtained with a blanking operation. Unlike the case where pieces are obtained from a blanking operation, the portions of the pieces P1 and P2 that are cut and eliminated as scrap are very small. After execution of laser cutting, the numerical-control unit of the system knows the co-ordinates of the edges 58, 60 of the pieces P1 and P2 with a precision higher than the one obtainable from a positioning of the pieces with respect to a system of mechanical locator blocks.

Figure 7:
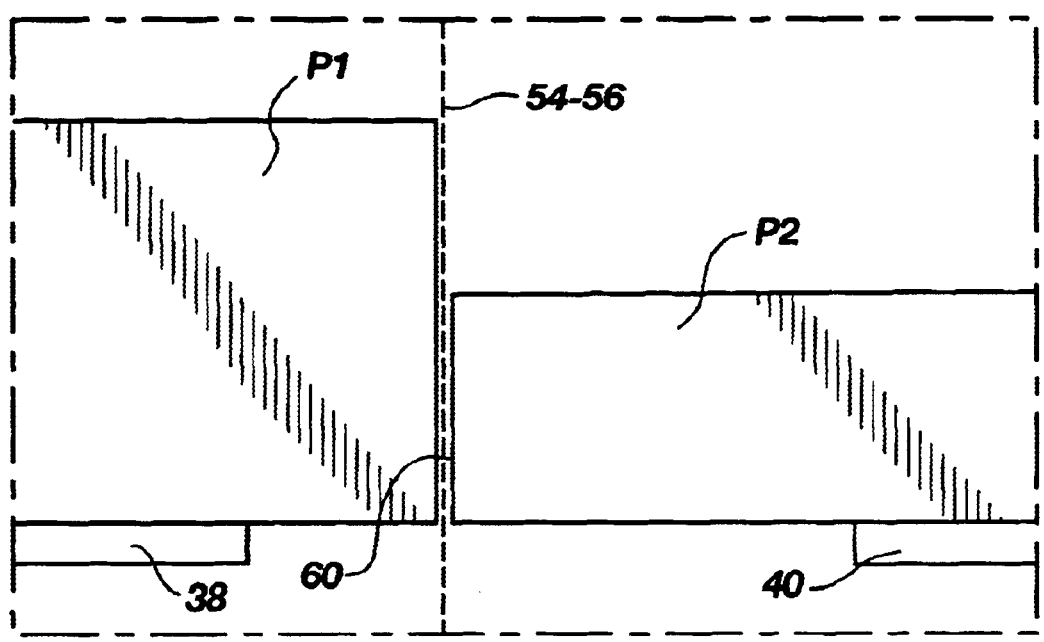

In the subsequent step, illustrated in FIG. 7, the numerical-control unit of the system governs movement of the workpiece-supporting structure 40 until the facing edges 58, 60 of the pieces P1 and P2 are brought up to one another. The operation of setting the pieces up against one another can be carried out with great precision since the numerical-control unit knows with a very high degree of accuracy the position in space of the edges 58, 60.

Figure 8:
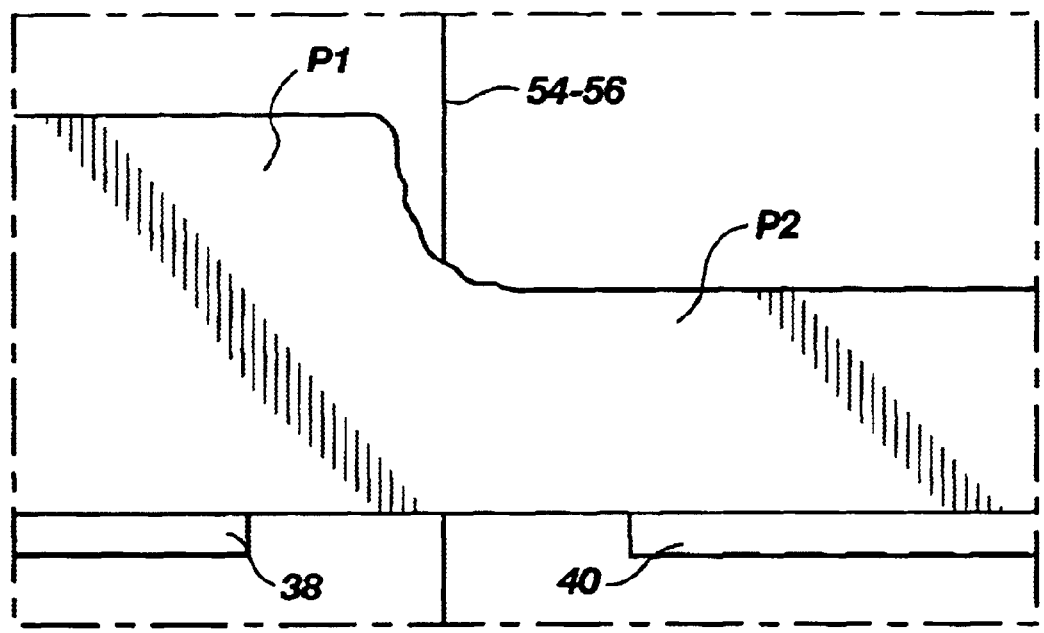

Finally, as illustrated in FIG. 8, the cutting and welding head 12 is switched so as to render the laser welding tip operative and is moved along a welding path defined according to the position in space of the edges 58, 60 set up against one another, in order to carry out laser welding of the pieces P1 and P2. FIG. 8 illustrates the area of connection between the pieces at the end of the welding process.

The operations described above can be repeated on the remaining sides of the pieces P1 and P2 in order to carry out joining of the said pieces to a further piece of metal sheet. Before execution of the weld, further cutting operations can be carried out on the pieces P1, P2 in the same operating cycle, for example to define the shape of the remaining sides of the pieces, or else to make holes or openings of various types in the pieces themselves.

The system according to the present invention is characterized by a very low investment cost as compared to conventional lines for the production of multi-thickness blanks. The system according to the invention enables maximum flexibility in the definition of the shape and size of the finished pieces and does not call for an accurate preparation of the welding edges. Use of a mobile table along two mutually orthogonal axes makes possible the production of pieces having complex shapes even with jointing lines set, for example, at right angles to one another. Re-programming of the shapes and sizes of the pieces to be produced can be performed with very short setting-up times.

What is claimed is:

1. A process for the production of multi-thickness blanks, comprising the steps of:

setting and holding a first piece of metal sheet on a first work piece supporting structure;

setting and holding a second piece of metal sheet on a second work piece supporting structure which is mobile with respect to the first work piece supporting structure under the control of a numerically controlled unit;

carrying out laser cutting of at least one edge of the first work piece and of the second work piece and defining reference lines of the first work piece and second work piece, respectively, the positions of which are known to the numerically controlled unit;

bringing the first work piece and the second work piece up to one another until they reach a position where the aforesaid reference lines overlap each other; and carrying out a laser weld between the first work piece and the second work piece along the aforesaid coinciding reference lines.

2. The process according to claim 1, comprising the step of moving at least one of said work pieces along two mutually orthogonal axes, according to a generic pre-defined path.

3. The process according to claim 2, comprising the steps of: welding together a first work piece and a second work piece; moving under the control of said numerically controlled unit a work piece resulting from the joining of said first work piece and said second work piece; and trimming and welding the resulting work piece to at least one third work piece along a trimmed edge of the latter.

4. The process according to claim 1, comprising the step of selectively switching a laser head between a cutting operating mode and a welding operating mode.

* * * * *

UNITED STATES PATENT AND TRADEMARK OFFICE
CERTIFICATE OF CORRECTION

PATENT NO. : 6,642,474 B2
DATED : November 4, 2003
INVENTOR(S) : Alberto Delle Piane and Duilio Macchi It is certified that error appears in the above-identified patent and that said Letters Patent is hereby corrected as shown below:

<u>Title page,</u>
Item [73], Assignee, change "Prima Industries, SpA" to -- Prima Industrie, SpA --

Signed and Sealed this

Fifteenth Day of June, 2004

JON W. DUDAS
*Acting Director of the United States Patent and Trademark Office*